United States Patent
Bischof et al.

(10) Patent No.: US 7,264,430 B2
(45) Date of Patent: Sep. 4, 2007

(54) MAGNETICALLY LEVITATED HIGH-SPEED SPINDLE FOR SHAPING IRREGULAR SURFACES

(75) Inventors: Kenneth R. Bischof, Olmsted Falls, OH (US); William J. Zdeblick, Ann Arbor, MI (US)

(73) Assignee: Federal Mogul World Wide, Inc, Southfield, MI (US)

( * ) Notice: Subject to any disclaimer, the term of this patent is extended or adjusted under 35 U.S.C. 154(b) by 216 days.

(21) Appl. No.: 11/065,618

(22) Filed: Feb. 24, 2005

(65) Prior Publication Data

US 2005/0188798 A1 Sep. 1, 2005

Related U.S. Application Data

(60) Provisional application No. 60/547,891, filed on Feb. 26, 2004.

(51) Int. Cl.
*B23B 3/00* (2006.01)
(52) U.S. Cl. .................. 409/231; 823/1.3; 408/147; 310/90.5
(58) Field of Classification Search ........... 409/231, 409/186, 193, 135; 408/147; 82/1.11, 158, 82/1.2–1.5; 310/90.5
See application file for complete search history.

(56) References Cited

U.S. PATENT DOCUMENTS

| | | | | |
|---|---|---|---|---|
| 4,180,946 A | * | 1/1980 | Heijkenskjold et al. | ........ 451/24 |
| 4,250,775 A | * | 2/1981 | Jerue et al. | .................. 82/1.11 |
| 4,612,833 A | * | 9/1986 | Slee | ............... 82/18 |
| 5,682,071 A | | 10/1997 | Buhler et al. | .............. 310/90.5 |
| 5,729,066 A | * | 3/1998 | Soong et al. | ............... 310/90.5 |
| 5,739,607 A | * | 4/1998 | Wood, III | .................. 310/90.5 |
| 5,783,887 A | * | 7/1998 | Ueyama et al. | ............ 310/90.5 |
| 5,828,151 A | | 10/1998 | Bustamante et al. | .......... 310/90 |

(Continued)

FOREIGN PATENT DOCUMENTS

CH 678090 7/1991

(Continued)

OTHER PUBLICATIONS

"Dynamics and Control of Magnetically Levitated High-Speed Rigid Rotor to Produce N-Waved Orbits" Bischof, Kenneth R.

*Primary Examiner*—Monica Carter
*Assistant Examiner*—Sara Addisu
(74) *Attorney, Agent, or Firm*—Robert L. Stearns; Dickinson Wright PLLC

(57) ABSTRACT

A magnetically levitated high-speed spindle assembly (20) is provided for forming non-circular holes (22) in workpieces (24) or non-circular surfaces on pins. The non-circular holes (22) can be formed with dimensionally varying axial trajectories at high speeds and with great accuracy. This is accomplished by supporting a rotating spindle (26) between first (58) and second (60) magnetic bearing clusters and independently controlling these bearing clusters (58, 60) to move a shaping tool (32) at the end of the spindle (26) in a predetermined orbital path (B). A multiple input-multiple output control strategy is used to control spindle (26) movements in the X and Y axes. The tilt angle between the cutting edge (34) of the shaping tool (32) and the orbital path (B) is maintained perpendicular under this multiple input-multiple output control of the magnetic bearing clusters (58, 60) to further improve shaping precision and spindle (26) stability during high-speed operations.

36 Claims, 7 Drawing Sheets

U.S. PATENT DOCUMENTS

| | | |
|---|---|---|
| 5,879,113 A * | 3/1999 | Ueyama et al. ............. 409/148 |
| 6,267,876 B1 | 7/2001 | Allaire et al. .............. 210/90.5 |
| 6,328,509 B1 * | 12/2001 | Lind .......................... 409/231 |
| 6,429,561 B1 | 8/2002 | Davis et al. ............... 310/90.5 |
| 6,508,614 B1 * | 1/2003 | Ozaki et al. ................ 409/231 |
| 7,057,319 B2 * | 6/2006 | Yamada ..................... 310/90.5 |
| 2003/0001445 A1 | 1/2003 | Paden et al. ............... 310/90.5 |
| 2003/0173845 A1 | 9/2003 | Allaire et al. ............. 310/90.5 |

FOREIGN PATENT DOCUMENTS

| | | |
|---|---|---|
| CH | 689808 | 11/1999 |
| DE | 3937687 | 5/1990 |
| DE | 19518539 | 11/1995 |
| EP | 0311122 | 4/1989 |
| IT | 1235599 | 9/1992 |
| JP | 54008248 | 1/1979 |
| JP | 61152304 A * | 7/1986 |
| JP | 7314274 | 12/1995 |

* cited by examiner

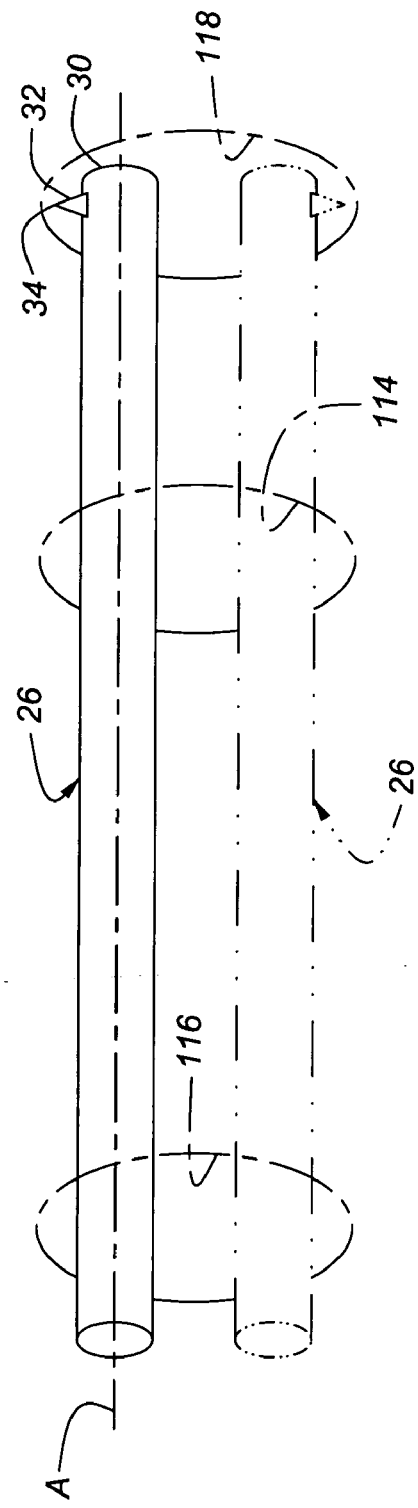
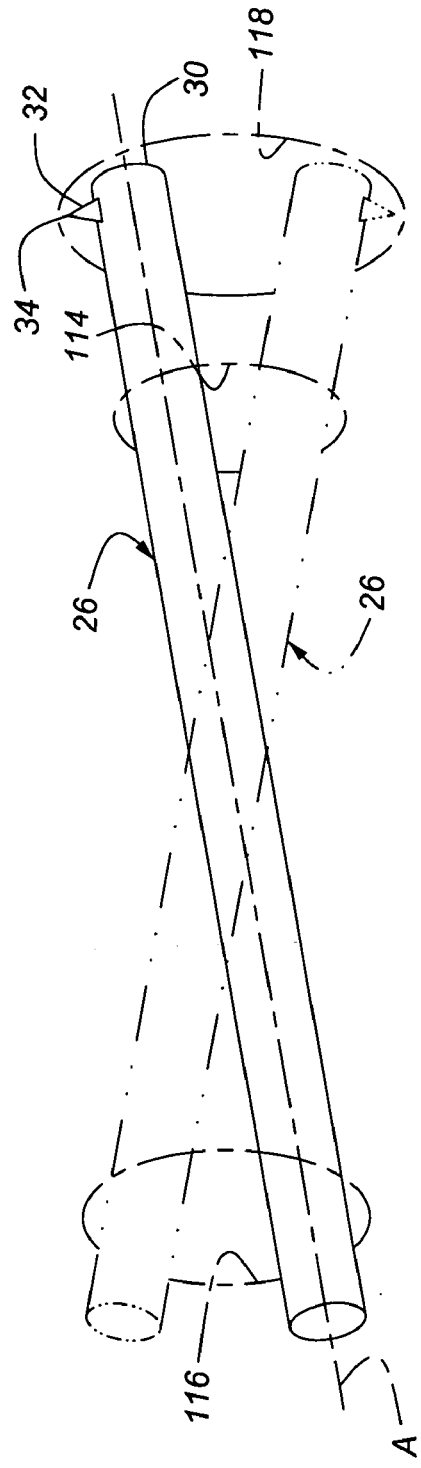

MAGNETICALLY LEVITATED HIGH-SPEED SPINDLE FOR SHAPING IRREGULAR SURFACES

This application claims priority to U.S. Provisional Application Ser. No. 60/547,891, filed Feb. 26, 2004.

BACKGROUND OF THE INVENTION

1. Technical Field

This invention relates generally to magnetically levitated high-speed spindle assemblies for shaping non-circular surfaces, and more particularly toward such an assembly for forming a non-circular hole in a workpiece.

2. Related Art

Some production applications require the formation of non-circular holes. For example, in the manufacture of pistons for an internal combustion engine, the so-called pin holes formed for the wrist, or gudgeon pin often have a slight trumpet shape opening toward the center for accommodating flex in the wrist pin. Additionally, this trumpet shape of the pin hole is optimally designed with a slight ovality to further account for distortion in the wrist pin as it moves through its various cycles. This trumpet shape and non-circular cross section of the pin hole must be formed to exacting tolerances. For example, tolerances in the range of 3 to 5 microns is often required for these types of applications.

There are industrial methods for creating such non-circular holes to exacting tolerance specifications, including hydraulically actuated milling tools and electro chemical machining techniques. The prior art has also suggested boring non-circular shapes using a special machine tool spindle equipped with active magnetic bearings. Active magnetic bearings act upon the principle that the rotating spindle is formed of or with a ferromagnetic material that is supported in a magnetic field generated by an electromagnet stator. A control system, with appropriate power amplifiers, modulates the magnetic field to maintain the spindle in the desired radial position while it rotates. This radial position can be maintained even under changing load conditions.

The advantage of an active magnetic bearing system resides in its ability to control spindle movement and intentionally introduce deviations in the spindle rotations to thereby move the shaping tool in a desired path. Numerous shortcomings and limitations in the prior art nevertheless exist. For example, the non-circular hole shapes which can be produced, particularly in 3 dimensions, is especially limited. And further, the ability to precisely control the position of the tool cutting edge and thereby yield tolerance variations less than 5 microns is not reliable. It is, therefore, an object of the invention to overcome these disadvantages and limitations.

SUMMARY OF THE INVENTION

The invention comprises a magnetically levitated high-speed spindle assembly for forming a non-circular hole with a dimensionally varying axial trajectory in a workpiece. The assembly comprises a spindle defining a longitudinally extending axial axis and having a shaping tool fixed at a shaping end thereof. A first magnetic bearing cluster supports the spindle proximate the shaping tool for magnetically levitated rotation about the axial axis. A second magnetic bearing cluster is spaced from the first magnetic bearing cluster and supports the spindle at a position remote from the shaping tool for magnetically levitated rotation about the axial axis. A radial bearing controller independently controls the first and second magnetic bearing clusters to adjust the radial position of the axial axis during magnetically levitated rotation of the spindle and thereby move the axial axis at the shaping end in a pre-determined non-circular orbital path. According to this aspect of the invention, the improvement comprises an axial motion controller for moving the shaping tool relative to the workpiece along the axial axis while simultaneously varying the shape of the orbital path so that a non-circular hole of continuously axially varying trajectory can be formed in the workpiece at high speeds and with great accuracy. Thus, non-circular holes with continuously varying cross-sectional areas and shapes can be formed by the independent, yet simultaneous, control of the magnetic bearing clusters and the axial position of the shaping tool relative to the workpiece.

According to a second aspect of the invention, a magnetically levitated high speed spindle assembly is provided for forming a non-circular hole in a workpiece. The assembly comprises an elongated spindle extending along an axial axis between a rear end and a shaping end. A shaping tool extends radially outwardly from the spindle adjacent the shaping end and terminates in a localized cutting edge. A first magnetic bearing cluster supports the spindle proximate the shaping end for magnetically levitated rotation about the axial axis. A second magnetic bearing cluster, spaced from the first magnetic bearing cluster, supports the spindle remote from the shaping end for magnetically levitated rotation about the axial axis. A radial bearing controller is provided for independently controlling the first and second magnetic bearing clusters to adjust the radial position of the axial axis during magnetically levitated rotation of the spindle and move the shaping end in a predetermined non-circular orbital path so that the high speed cutting edge will form a correspondingly shaped non-circular hole in the workpiece. According to this aspect of the invention, a cutting edge controller is provided for maintaining a continuous tilt angle between the cutting edge and the orbital path. The tilt angle comprises an optimal cutting angle defined by the angle between the radius extending from the axial axis to the cutting edge and the tangent line to any point along the orbital path whereby the non-circular hole can be shaped with improved precision and the assembly can operate at higher rotational speed while providing greater spindle stability.

According to yet another aspect of the subject invention, a method for magnetically levitating a high speed spindle assembly is provided. The method is practiced for forming an irregular hole with a dimensionally varying axial trajectory in a workpiece. The method comprises the steps of affixing a radially extending shaping tool to one end of the spindle having a axial axis, establishing a magnetic levitation field about a first region of the spindle proximate the shaping tool for rotation about the axial axis, establishing a magnetic levitation field about a second region of the spindle spaced from the first region and remote from the shaping tool, rotating the spindle within the first and second magnetic levitation fields about the axial axis, and adjusting the radial position of the axial axis at the first and second regions during rotation of the spindle by varying the independently and second levitation fields to thereby move the axial axis at the shaping end in a predetermined non-circular orbital path. The method is characterized by forming a hole of irregular and axially varying trajectory in the workpiece by moving the shaping tool relative to the workpiece along the axial axis simultaneously with the step of adjusting the radial position of the axial axis at the first and second regions.

According to yet another aspect of the invention, a method for magnetically levitating a high speed spindle assembly in contemplated. The method is practiced for forming a non-circular hole in a workpiece and comprises the steps of forming a cutting edge on a shaping tool, affixing the shaping tool to one end of the spindle having an axial axis such that the cutting edge is positioned radially outwardly from the axial axis, establishing a magnetic levitation field about a first region of the spindle proximate the shaping tool for rotation about the axial axis, establishing a magnetic levitation field about a second region of the spindle, spaced from the first region and remote from the shaping tool, rotating the spindle within the first and second magnetic levitation field without the axial axis and adjusting the radial position of the axial axis at the first and second regions during rotation of the spindle by varying the first and second magnetic levitation fields to thereby move the cutting edge in a predetermined non-circular orbital path to form the non-circular hole in the workpiece. The improvement comprises maintaining the continuous tilt angle between the cutting edge and the orbital path so that the non-circular hold can be shaped with improved precision and the spindle can operate at higher rotation speeds and with greater stability. The tilt angle comprises an optimal cutting angle defined by the angle between a radius extending from the axial axis to the cutting edge and the tangent line to any point along the non-circular orbital path.

The hole forming assembly and method according to the subject invention overcomes the disadvantages and shortcomings of the prior art by expanding the available range of hole shapes and configurations, particularly in a three-dimensional sense, which can be formed with great accuracy at high speeds.

BRIEF DESCRIPTION OF THE DRAWINGS

These and other features and advantages of the present invention will become more readily appreciated when considered in connection with the following detailed description and appended drawings, wherein:

FIG. 10 is a simplified view of the spindle assembly illustrating upper and lower orbital limits within the first and second magnetic bearing clusters for situations in which the axial axis of the spindle remains parallel throughout its orbital path; and FIG. 11 is a view as in FIG. 10 showing the extreme limits of the orbital path when the spindle is controlled at opposite extreme limits by the first and second magnetic bearing clusters.

DETAILED DESCRIPTION OF THE PREFERRED EMBODIMENT

Figure 1:
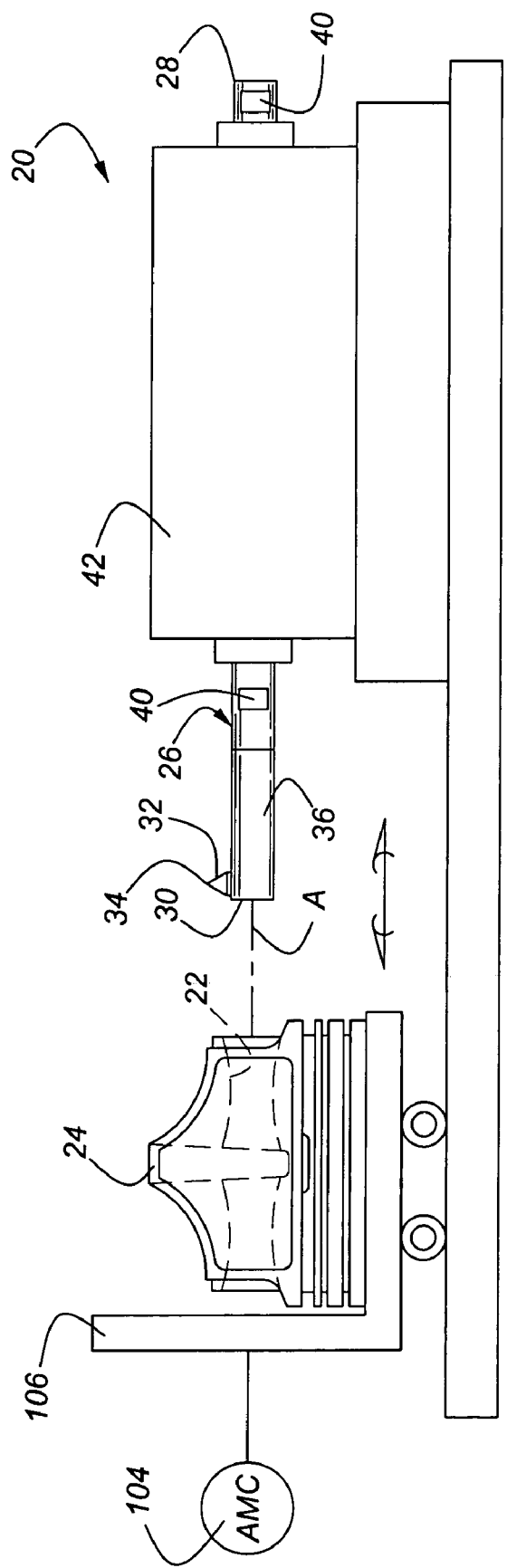
FIG. 1 is a simplified front elevation of a spindle assembly according to the subject invention and a piston workpiece prepared for a hole forming operation.
Figure 2:
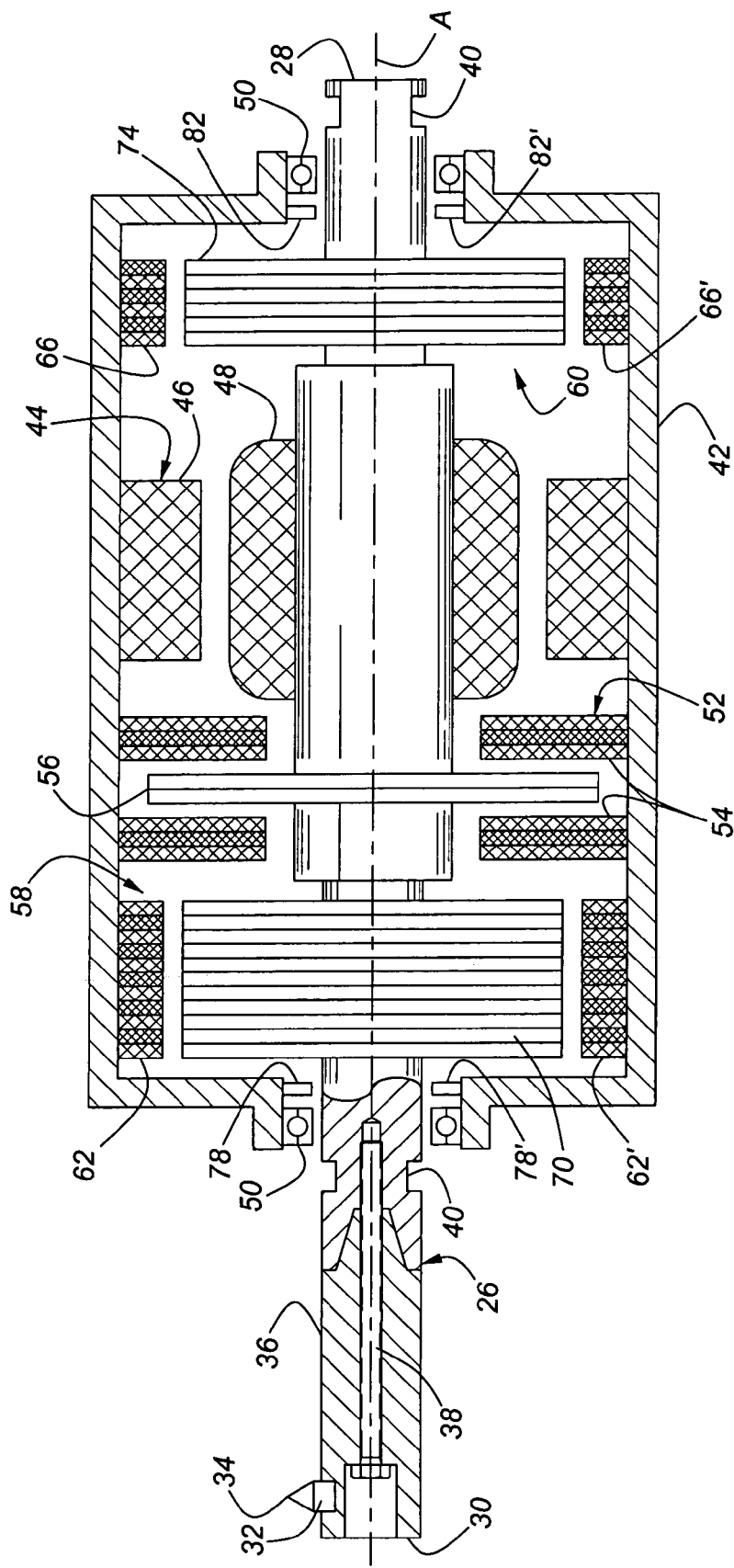
FIG. 2 is simplified cross-section of a magnetically levitated high speed spindle assembly according to the invention.

Referring to the Figures, wherein like numbers indicate like or corresponding parts throughout the several views, a magnetically levitated high-speed spindle assembly is generally shown at 20 in FIGS. 1 and 2. The spindle assembly 20 is of the type for forming non-circular holes 22 in a workpiece 24. In FIG. 1, the workpiece 24 is shown for purposes of example only comprising a piston for an internal combustion engine. The non-circular hole 22 is illustrated as the pin hole for containing the wrist pin (not shown) as is well known in the art. The workpeice 24, however, may comprise any component and is not limited to pistons, engines or even automotive applications. Rather, any field of endeavor in which a non-circular hole 22 of high precision tolerance may be applicable.

The assembly 20 includes a rigid shaft-like spindle, generally indicated at 26 extending along an axial axis A between a rear end 28 and a shaping end 30. A shaping tool 32 extends radially outwardly from the spindle 26 adjacent it's shaping end 30, and terminates in a point-like cutting edge 34. The shaping tool 32 could, for example, comprise a removable carbide tip of any commercially available shapes As shown in the cross section of FIG. 2, the shaping tool 32 may be held in a removable tool holder 36 which is secured to the spindle 26 via a taper and bolt arrangement 38. The spindle 26 is provided with wrench flats 40 adjacent its rear 28 and shaping 30 ends to facilitate removal of the shaping tool 32 for maintenance and tool holder 36 interchanges.

The assembly 20 further includes a housing 42 through which the rear 28 and shaping 30 ends of the spindle 26 extend. A drive motor, generally indicated at 44 in FIG. 2, is disposed within the housing 42 and operates to forcibly rotate the spindle 26 about its axial axis A. The drive motor 44 may be of any known variety, operating on either AC or DC current. Alternatively, the drive motor 44 may be fluid actuated, air actuated or actuated from any other type of energy source. In the example shown, the drive motor 44 includes an electrical stator 46 fixed within the housing 42 and a rotor or armature 48 fixed to the spindle 26.

A pair of auxiliary bearings 50 are supported in opposite ends of the housing 42 and provided with substantial clearance between the spindle 26. The auxiliary bearings 50 act as a back up safety mechanism so that, in the event of a failure in the magnetic levitation system, the spindle 26 rotating at high speeds can be carried to a safe stop upon the auxiliary bearings 50 without damaging any components.

In order to ensure proper axial alignment of the spindle 26 within the housing 42, a magnetic thrust bearing, generally indicated at 52, is interposed between the housing 42 and the spindle 26. The magnetic thrust bearing 52 comprises two stators 54 disposed on opposite sides of a rotor disk 56. The stators 54 may be made of solid steel, or of solid steel wedges with radial slots in-between the wedges and filled with laminations. The stators 54 are also filled with coils to create counteracting axial forces in a field containing the rotor disk 56. Although not shown, the assembly 20 may also include an axial position sensor, acting in conjunction with the thrust bearing 52, and power amplifier to determine and control the axial position of the spindle 26.

Figure 3:
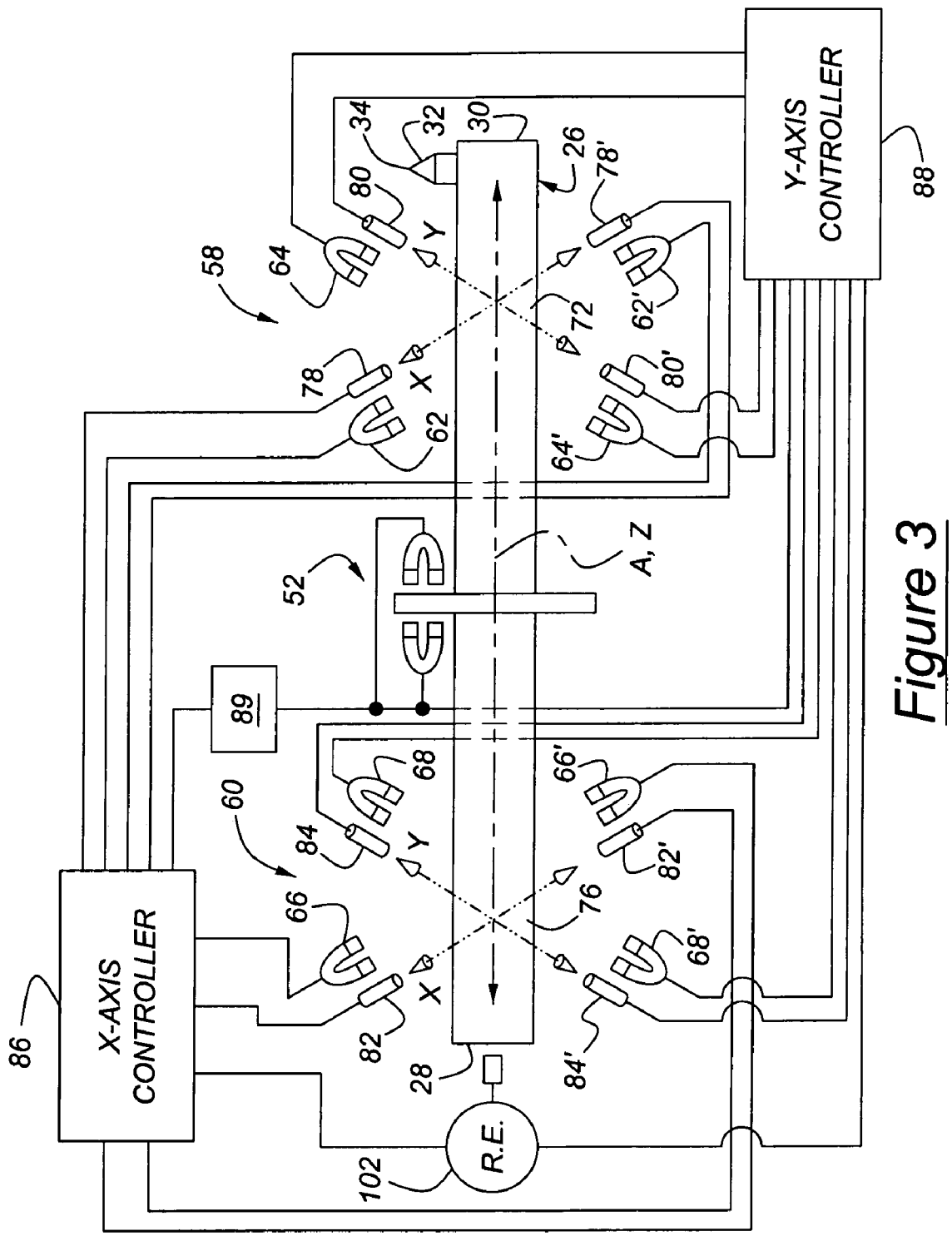
FIG. 3 is a schematic showing a spindle according to the subject invention magnetically levitated between first and second magnetic bearing clusters, with respective radial bearing controllers for magnet stators and position sensors in the respective X and Y coordinate planes.

Referring now to FIG. 3, a first magnetic bearing cluster, generally shown at 58, supports the spindle 26 nearest the shaping tool 32 for magnetically levitated rotation about its axial axis A. Similarly, a second magnetic bearing cluster, generally shown at 60, is spaced from the magnetic bearing cluster 58 for supporting the spindle 26 on the other side from the shaping tool 32 for magnetically levitated rotation about the axial axis A. In other words, the first magnetic bearing cluster 58 is proximate the shaping end 30 of the spindle 26, whereas the second magnetic bearing cluster 60 is proximate the rear end 28 of the spindle 26.

The first magnetic bearing cluster 58 includes at least three, and preferably four magnet stators spaced in generally equal arcuate increments within a common plane perpendicular to the axial axis A. The magnet stators are usually arranged in pairs—a pair of opposing X-coordinate magnet stators 62, 62' and a pair of opposing Y-coordinate magnet stators 64, 64'. The X-coordinate stators 62, 62' are themselves contained in a so-called X-plane passing diagonally through the axial axis A and oriented at an approximate 45 degree angle relative to horizontal. The upper X-coordinate stator 62 is located above the axial axis A, whereas the lower X-coordinate stator 62' is located below the axial axis A. The Y-coordinate stators 64, 64' are disposed in a so-called Y-plane containing the axial axis A which is approximately 45 degrees relative to horizontal. The Y-plane is perpendicular to the X-plane. Thus, the axial axis A is coincident with the intersection of the X- and Y-planes when the spindle 26 is perfectly centered within the first 58 and second 60 bearing clusters. The stationary intersection of the X-plane with the Y-plane forms a is the bearing axis Z. Thus, when the spindle 26 is in a neutral, centered position, the bearing axis Z and axial axis A are coincident. However, as the spindle 26 is manipulated by current fluctuations and other external impulses, the axial axis A is translated and rotated relative to the fixed bearing axis Z.

Similarly, the second magnetic bearing cluster 60 includes X-coordinate stators 66, 66' and Y-coordinate stators, 68, 68' oriented in similar fashion to those of the first magnet bearing cluster 58. The X-coordinate stators 62, 62', 66, 66' all lay within the X-plane, and the Y-coordinate stators 64, 64', 68, 68' all lay within the Y-plane. In FIG. 3, these magnet stators are represented schematically as U-shaped fixed magnets. However, in practice theses stators may be made of a stack of lamination rings with poles on their internal diameter. Coils are wound around each pole so that each bearing cluster may be divided into four quadrants. The coils in each quadrant function as a single electromagnet. As described, and particularly in situations where the spindle 26 is supported in a generally horizontal condition, the quadrants are aligned 45 degrees from vertical so as to distribute the gravitational reaction force.

Referring again to FIG. 2, the first magnet bearing cluster 58 is shown including a first rotor 70 disposed on a first region 72 of the spindle 26. The first rotor 70 consists of a stack of lamination rings mounted on a sleeve and fitted to the spindle 26. Laminations are effective to improve the responsiveness of the first magnetic bearing cluster 58. Likewise, the second magnetic bearing cluster 60 includes a second rotor 74 disposed on a second region 76 of the spindle 26. The first 70 and the second 74 rotors are generally identical in construction, however may vary slightly in size and shape depending upon the design application for the assembly 20.

At least three, and preferably four first position sensors are spaced in generally equal arcuate increments in a common perpendicular plane relative to the axial axis A and located adjacent the first magnetic bearing cluster 58. Preferably, as shown in FIG. 3, the first position sensors include a pair of opposing X-coordinate sensors 78, 78' adjacent the respective first X-coordinate stators 62, 62' and opposing pairs of Y-coordinate position sensors 80, 80' located next to the corresponding Y-coordinate stators 64, 64'. In like manner, opposing X-coordinate position sensors 82, 82' and Y-coordinate sensors 84, 84' of the second position sensors are located adjacent to the respective X and Y coordinate stators 66, 66', 68, 68'. All of the position sensors operate by feeding information about the position of the spindle 26 in the form of an electrical voltage. Normally, these position sensors are calibrated so that when the spindle 26 is in a neutral position, the sensor produces a null voltage. When the spindle 26 moves above the neutral position, a positive voltage is produced. When the spindle 26 moves below the neutral position, a negative voltage results.

A radial bearing controller independently controls the first 58 and second 60 magnetic bearing clusters to adjust the radial position of the axial axis A, relative to the bearing axis Z, during magnetically levitated rotation of the spindle 26. By independently controlling the spindle 26 position relative to the first 58 and second 60 magnetic bearing clusters, the axial axis A at the shaping end 30 can be articulated and caused to scribe a highly controlled non-circular orbital path B. The radial bearing controller may be of the centralized type coordinating inputs from all of the sensors and issuing outputs to all of the bearing clusters to achieve the desired articulation of the shaping end 30.

Alternatively, the radial bearing controller may include an X-axis controller 86 and a separate Y-axis controller 88. In this configuration, the X-axis controller 86 receives voltage signals from the X-coordinate position sensors 78, 78', 82, 82', processes this information within a mathematical model including dimensional relationships such as axial distance to the cutting edge 34 and the tool radius measured from the axial axis A to the cutting edge 34, and sends current (or voltage) requests to an integrated or stand-alone amplifier. Thus, the X-axis controller 86 receives multiple inputs, i.e., inputs from every sensor in the X-plane, and issues multiple outputs to all of the stators in the X-plan to dynamically control the spindle 26. The X-axis controller 86 may include anti-aliasing filters, analog-to-digital converters, a digital signal processor, and pulse-width modulation generators. Voltage from the position sensors 78, 78', 82, 82' is passed through the anti-aliasing filters to eliminate high frequency noise from the signal. After the high frequency content is removed, the position signal is sampled by an analog-to-digital converter which converts the voltage signal to a form that can be processed by a digital signal processor. The digital information is then passed through a digital filter and produces an output proportional to the amount of current (or voltage) required to correct or adjust the position of the spindle 26 according to a predetermined value. The requested current is compared to the actual currents supplied to the magnetic bearing cluster 58, which is also sent, filtered and sampled with an analog-to-digital converter. The error between the actual and requested current is used to characterize the pulse-width modulation signal sent to the amplifiers. This information is then sent to the pulse-width modulation generators which creates the pulse-width modulation wave forms sent to the amplifiers. The Y-axis controller 88 works in a similar fashion receiving multiple input signals from the Y-coordinate sensors 80, 80', 84, 84' and issuing multiple corrective actions via outputs to the second magnetic bearing cluster 60.

The X-axis controller 86 and Y-axis controller 88 can be designed for either Class A tuning or Class B tuning. In Class B tuning, the current supply delivered to each of the X-coordinate stators 62, 62', 66, 66' by the X-axis controller 86 is varied between the respective opposing stators in non-linearly proportional increments. This method of Class B tuning is useful to create greater flexibility in shape generation of the orbital path B, and is also instrumental in controlling stiffness and stability in the spindle 26 at large movements away from the center of the bearing.

A thrust bearing controller 89 can be optionally configured for even greater spindle 26 control. The thrust bearing controller 89 would receive inputs from the axial position sensor (not shown) and issue corrective outputs to the magnetic thrust bearing 52 as described above. Here, as shown in FIG. 3, the thrust bearing controller 89 could communicate with the X-axis controller 58 and the Y-axis controller 60 so as to intentionally manipulate the magnetic thrust bearing 52 in concert with the radial bearings 62, 64, 66, 68. Alternatively, this coordinated control of the radial and thrust bearings can be accomplished within the embodiment of a centralized bearing controller which commands all of the bearings from a single station.

Figure 4:
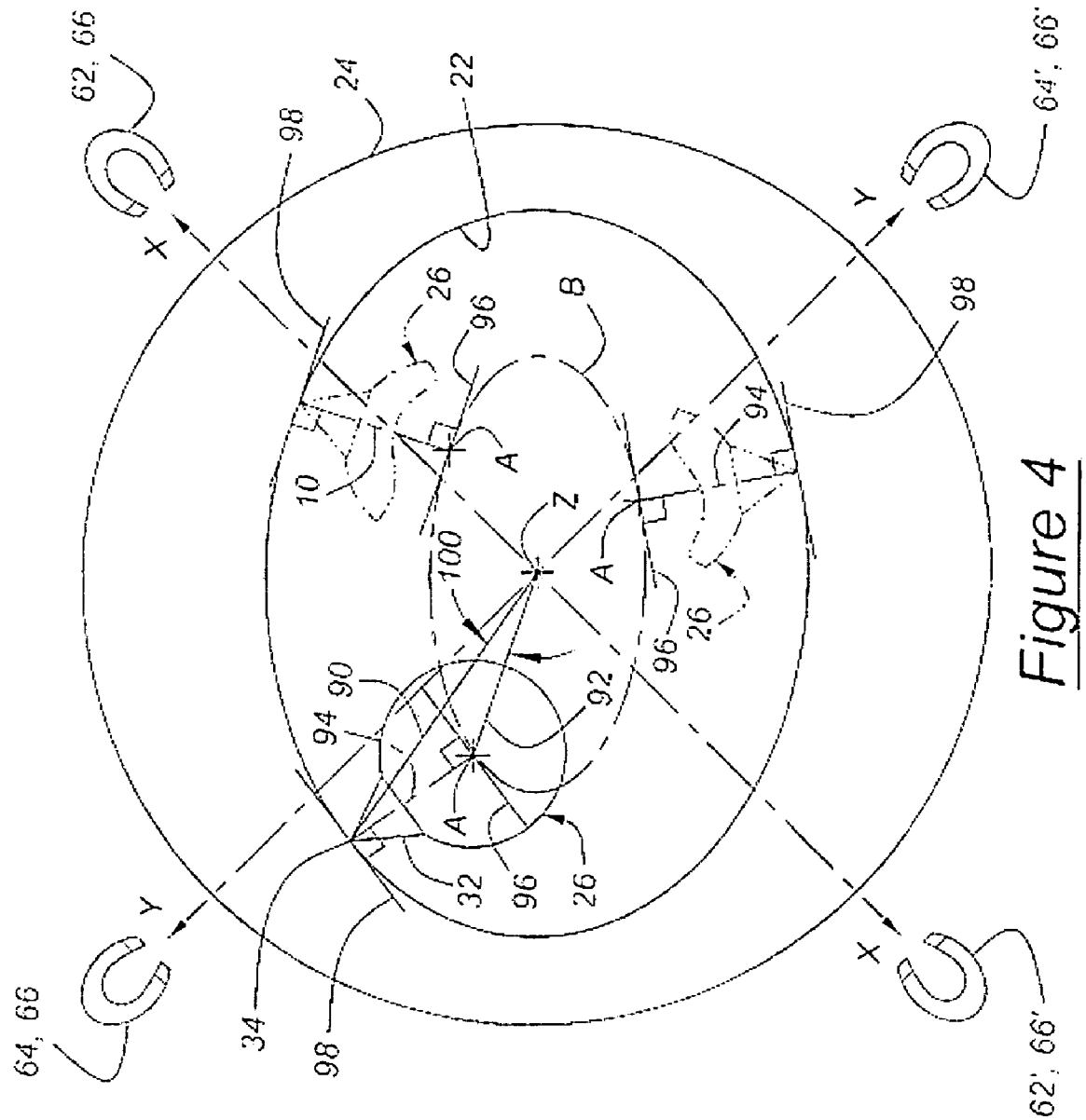
FIG. 4 is an exaggerated cross-section of a non-circular hole formed in a workpiece with a shaping tool shown in various positions about its orbital path in phantom.

Referring now to FIG. 4, the movement of the shaping tool 32 is shown as the axial axis A moves about its orbital path B. The shaping tool 32 is shown is solid with the axial axis A of the spindle offset from the bearing axis Z. The point at which the cutting edge 34 contacts the non-circular hole 22 of the workpiece 24 establishes a point of reference. A line drawn from the bearing axis Z to the cutting edge 34 comprises a shape radius 90. A line drawn from the bearing axis Z to the axial axis A comprises an orbit radius 92. A line drawn from the axial axis A to the cutting edge 34 comprises a tool radius 94. In the preferred embodiment of this invention, the tilt angle, i.e., the angle of the tool radius 94 relative to a tangent line 96 on the orbital path B, remains constant, and preferably perpendicular throughout the entire shaping operation. The tool radius 94 likewise remains perpendicular to a tangent line 98 drawn at the point of contact with the hole 22. As shown by the phantom representations in FIG. 4, this tilt angle remains consistent throughout the movement of the axial axis A about the orbital path B. The coordinated controlling of the first 58 and 60 magnetic bearing clusters using multiple input-multiple output control strategy is necessary to accomplish this maintained continuous tilt angle. This continuous, preferably perpendicular, tilt angle is maintained even though the included angle 100 between the shape radius 90 and the orbit radius 92 fluctuates between positive and negative values throughout the orbit cycle. By using the X-axis 86 and Y-axis 88 controllers to control the respective first 58 and second 60 magnetic bearing clusters, a continuous tilt angle can be maintained between the cutting edge 34 and the orbital path B so that the non-circular hole 22 can be shaped with considerable precision. Also, by maintaining the tilt angle at all points along the orbital path B, the assembly 20 can operate at higher rotational speeds and with greater spindle stability because reaction forces from the shaping tool 32 will fluctuate less. Of course, an optimal tilt angle may be something other than 90°, and the controllers 86, 86' can be programmed to maintain the optimal angle throughout the shaping cycle.

A rotary position sensor, in the form of a rotary encoder 102, is shown schematically in FIG. 3 for determining the angular position of the spindle 26, and thus the position of the shaping tool 32, about the axial axis A. The rotary encoder 102 communicates with the X-axis controller 86 and the Y-axis controller 88 to enable coordinated adjustments with the first 58 and second 60 magnetic bearing clusters. Preferably, these controllers 86, 88 control the shaping tool 32 in such a way that it completes one revolution about the axial axis A simultaneously with the shaping end 30 of the spindle 26 completing one lap around the orbital path B. This facilitates maintenance of an optimal tilt angle throughout the full sweep of the orbital path B. However, for complex hole 22 shapes, it may be necessary to lift the shaping tool 32 from the hole 22 surface while the spindle 26 repositions. Thus, complex hole shapes may require multiple rotations of the shaping tool 32 relative to each lap about the orbital path B.

An axial motion controller is schematically represented at 104 in FIG. 1. The axial motion controller 104 moves the shaping tool 32 relative to the workpiece 24 in directions generally parallel with the axial axis A while the shaping tool 32 simultaneously forms the non-circular hole 22. At the same time, the controllers, 86, 88 actuate the magnetic bearing clusters 58, 60 thus dimensionally varying the axial trajectory of the hole 22 in the workpiece 24. The axial motion controller 104 can operate by holding the workpiece 24 stationary and translating the spindle assembly 20, or as shown in FIG. 1 may include a workpiece holder 106 which is moved relative to a stationary spindle assembly 20. Alternatively, both components can be moved at the same time.

Figure 5:
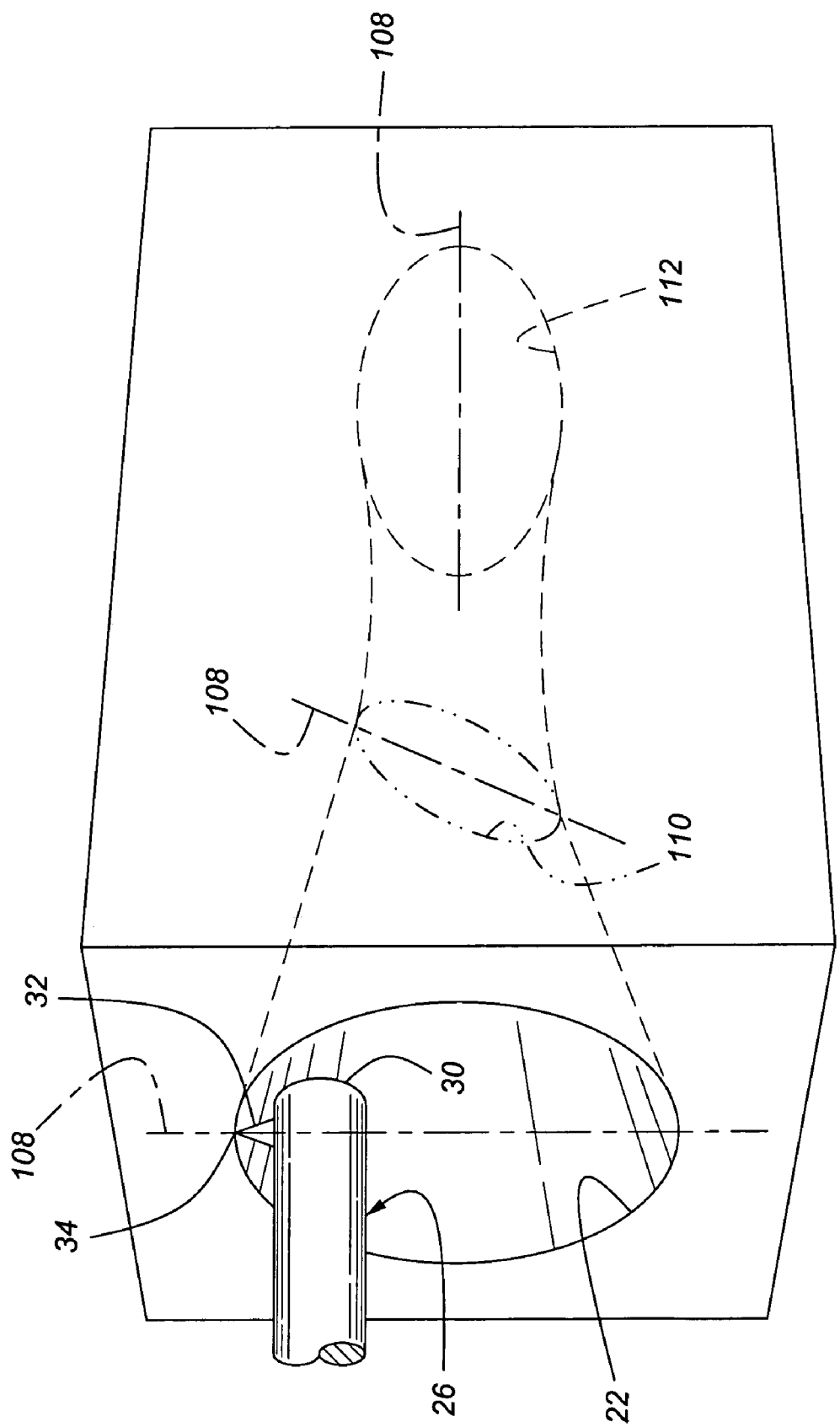
FIG. 5 is a simplified perspective illustrating an exemplary hole geometry in a workpiece in which a continuously axially varying trajectory is created by the shaping tool.
Figure 7:
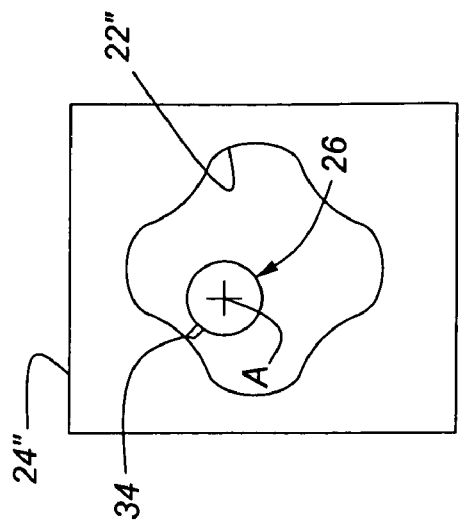
FIG. 7 is view as in FIG. 6 yet illustrating yet another non-circular hole geometry having multiple lobes.
Figure 6:
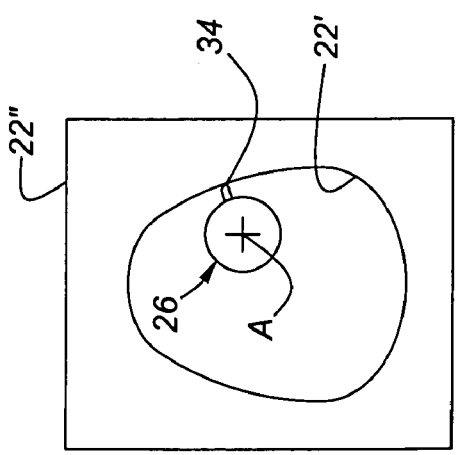
FIG. 6 illustrates another exemplary non-circular hole geometry having two irregular lobes.

This combination of axial, or axial, movement coupled with the continuously varying orbital path B enables creation of geometrically complex shapes such as that shown in FIG. 5. Here, the hole 22 is shown having a generally elliptical profile at the opening of the workpiece 24, wherein the ellipse has a generally vertical major axis 108. As the hole 22 extends deeper into the workpiece 24, the size of the ellipse reduces, while the major axis 108 is rotated in a clockwise direction. This is represented by the phantom elliptical cross-section at the midpoint 110. As the hole 22 continues deeper into the workpiece 24, the shape of the hole 22 enlarges while the major axis 108 continues to rotate clockwise until reaching a termination point 112 wherein the major axis 108 of the elliptical shape is now generally horizontal. The complex, dimensionally varying axial trajectory of the hole 22 in the workpiece 24 is not limited to the configuration shown in FIG. 5. For example, FIG. 6 illustrates a non-elliptical, irregular hole 22' of a 2-lobed cam-like shape. Alternatively, FIG. 7 illustrates a multi-lobed shape of the hole 22". Those skilled in the art will appreciate that nearly any geometrically conceivable shape can be produced using the subject spindle assembly 20 and the multiple input-multiple output control strategy of the controllers 86, 88.

Figure 9:
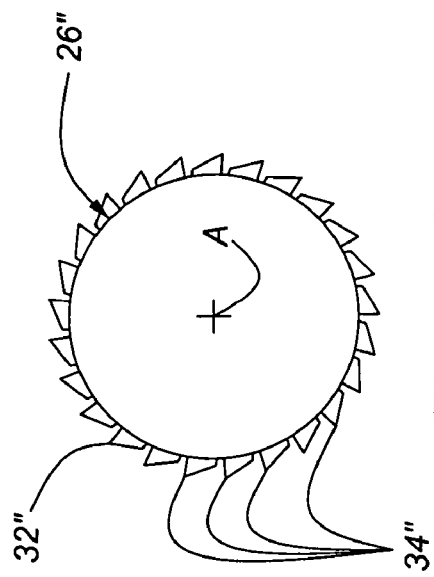
FIG. 9 is an end view as in FIG. 8 yet showing yet another alternative embodiment of the shaping tool including a plurality of cutting edges.
Figure 8:
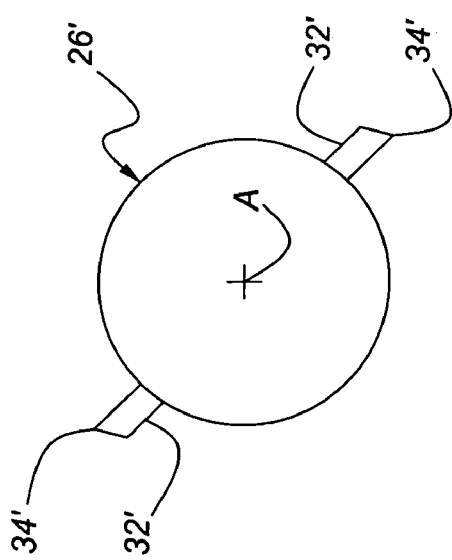
FIG. 8 is an end view of an alternative shaping tool configuration including two opposing cutting edges.

FIGS. 8 and 9 illustrate various alternative arrangements of the shaping tool 32' wherein two or more cutting edges 34' may be used. Alternatively, the cutting edge 34" may extend continuously around the shaping end 30" in the form of a grinding disk or wheel (not shown).

FIGS. 10 and 11 illustrate extreme spindle 26 orientation possibilities by theoretical circles 114, 116 representing the maximum range of motion for the first 72 and second 76 regions of the spindle 26 within the respective first 58 and second 60 magnetic bearing clusters. The cutting radius of the cutting edge 34 is represented by phantom theoretical circle 118. As will be appreciated, the multiple input-multiple output control strategy deployed through the controllers 86, 88, operating within the possible motion ranges depicted, can enable an infinite variety of hole 22 shapes which can vary continuously in the axial direction. And, this control strategy is readily adaptable to high-speed manufacturing operations, e.g., those in which the spindle 26 is driven above 10,000 RPM.

Although the exemplary embodiments of this invention have been described in connection with hole formation in the more traditional sense, those skilled in the art will appreciate that these novel techniques can be carried out on an external surface. Thus, shaping of the non-circular surface can be carried out on a male number with only straight-forward modifications to the shaping tool 34. Therefore, the invention contemplates a surface shaping methodology and device which can be used with equal effectiveness on holes and pin-like features requiring non-round shapes with dimensionally varying trajectories.

Obviously, many modifications and variations of the present invention are possible in light of the above teachings. It is, therefore, to be understood that within the scope of the appended claims, the invention may be practiced otherwise than as specifically described. The invention is defined by the claims.

What is claimed is:

1. A magnetically levitated high-speed spindle assembly for forming a non-circular surface in a workpiece, said assembly comprising:
    an elongated spindle extending along an axial axis between a rear end and a shaping end; a shaping tool extending radially outwardly front said spindle adjacent said shaping end and terminating in a point-like cutting edge;
    a first magnetic bearing cluster supporting said spindle proximate said shaping end for magnetically levitated rotation about said axial axis;
    a second magnetic bearing cluster spaced from said first magnetic bearing cluster and supporting said spindle remote from said shaping end for magnetically levitated rotation about said axial axis;
    a radial bearing controller for independently controlling said first and second magnetic bearing clusters to adjust the radial position of said axial axis during magnetically levitated rotation of said spindle and move said shaping end in a predetermined non-circular orbital path so that said cutting edge will form a correspondingly shaped non-circular hole in the workpiece; and a cutting edge controller for maintaining a continuous tilt angle between said cutting edge and said orbital path so that said cutting edge remains in continued contact with the workpiece while said shaping end of said spindle traverses said orbital path, wherein said tilt angle comprises an optimal cutting angle defined by the angle between a radius extending from said axial axis to said cutting edge and a tangent line to any point along said orbital path whereby the non-circular hole can be shaped by said cutting edge with improved precision and said assembly can operate at higher rotational speeds and with greater spindle stability.

2. The assembly of claim 1 wherein said tilt angle is a substantially right angle.

3. The assembly of claim 1 wherein said orbital path is an irregular shape.

4. The assembly of claim 1 wherein said first magnetic bearing cluster includes at least three magnet stators spaced in generally equal arcuate increments in a common plane about said axial axis.

5. The assembly of claim 4 further including at least three first position sensors spaced in generally equal arcuate increments in a common plane about said axial axis proximate to said at least three magnet stators of slid first magnetic bearing cluster.

6. The assembly of claim 5 wherein said second magnetic bearing cluster includes at least three magnet stators spaced in generally equal arcuate increments in a common plane about said axial axis.

7. The assembly of claim 6 further including at least three second position sensors spaced in generally equal arcuate increments in a common plane about said axial axis proximate to said at least three magnet stators of said second magnetic bearing cluster.

8. The assembly of claim 1 wherein said first magnetic bearing cluster includes a pair of opposing X-coordinate magnet stators and a pair of opposing Y-coordinate magnet stators, said X-coordinate magnet stators spaced between and generally co-planar with said Y-coordinate magnet stators.

9. The assembly of claim 8 wherein said radial bearing controller includes a pair of opposing X-coordinate position sensors adjacent to said pair of opposing X-coordinate magnet stators of said first magnetic bearing cluster, and a pair of opposing Y-coordinate position sensors adjacent to said pair of opposing Y-coordinate magnet stators of said first magnetic bearing cluster.

10. The assembly of claim 9 wherein said first magnetic bearing cluster includes a first rotor disposed on a first region of said spindle within said common plane formed between corresponding said X-coordinate and Y-coordinate magnet stators.

11. The assembly of claim 10 wherein said second magnetic bearing cluster includes a pair of opposing X-coordinate magnet stators and a pair of opposing Y-coordinate magnet stators, said X-coordinate magnet stators spaced between and generally co-planar with said opposing Y-coordinate magnet stators.

12. The assembly of claim 11 wherein said radial bearing controller includes a pair of opposing X-coordinate position sensors adjacent to said pair of opposing X-coordinate magnet stators of said second magnetic bearing cluster, and a pair of opposing Y-coordinate position sensors adjacent to said pair of opposing, Y-coordinate magnet stators of said second magnetic bearing cluster.

13. The assembly of claim 12 wherein said second magnetic bearing cluster includes a second rotor disposed on a second region of said spindle within said common plane formed between said corresponding X-coordinate and Y-coordinate magnet stators.

14. The assembly of claim 11 wherein said radial bearing controller includes a variable current generator for varying the supply of current to each of said pair of X-coordinate magnets of said first bearing cluster in non-linearly proportional increments.

15. The assembly of claim 1 further including a rotary position sensor for determining the angular position of said shaping tool about said axial axis.

16. The assembly of claim 15 wherein said shaping tool completes one revolution about said axial axis simultaneously with shaping end completing one lap around said orbital path.

17. The assembly of claim 1 further including an axial motion controller for moving said shaping tool relative to the workpiece along said axial axis while simultaneously varying the shape of said orbital path whereby a non-circular hole of continuously axially varying trajectory can be formed in the workpiece at high speeds and with great accuracy.

18. The assembly of claim 17 wherein said axial motion controller includes a workpiece holder.

19. The assembly of claim 1 further including a housing.

20. The assembly of claim 19 further including a magnetic thrust bearing associated with said spindle for limiting axial movement of said spindle relative to said housing.

21. The assembly of claim 19 further including a drive motor disposed within said housing for forcibly rotating said spindle about said axial axis.

22. The assembly of claim 19 wherein said housing includes at least two auxiliary bearings.

23. A method for magnetically levitating a high-speed spindle assembly for forming a non-circular hole in a work piece, said method comprising the steps of:
forming a cutting edge on a shaping tool; affixing the shaping tool to one end of a spindle having an axial axis such that the cutting edge is positioned radially outwardly from the axial axis;
establishing a magnetic levitation field about a first region of the spindle proximate the shaping tool for rotation about the axial axis;
establishing a magnetic levitation field about a second region of the spindle spaced from the first region and remote from the shaping tool;
rotating the spindle within the first and second magnetic levitation fields about the axial axis;
adjusting the radial position of the axial axis at the first and second regions during rotation of the spindle by varying the first and second magnetic levitation fields to thereby move the cutting edge in a predetermined non-circular orbital path to form the non-circular hole in the workpiece;
and maintaining a continuous tilt angle between the cutting edge and the orbital path so that the cutting edge remains in continued contact with the workpiece while traversing the orbital path, wherein the tilt angle comprises an optimal cutting angle defined by the angle between a radius extending from the axial axis to the cutting edge and a tangent line to any point along the non-circular orbital path whereby the non-circular hole can be shaped by the cutting edge with improved precision and the spindle can operate at higher rotational speeds and with greater stability.

24. The method of claim 23 wherein step of maintaining a continuous tilt angle includes maintaining the tilt angle at a substantially) right angle.

25. The assembly of claim 23 further including the step of directing the orbital path in an irregular shape.

26. The method of claim 23 further including the step of determining the instantaneous angular position of the shaping tool about the axial axis during said step of forming the hole.

27. The method of claim 26 further including the step of timing the angular speed of the shaping tool so that the shaping tool completes one revolution about the axial axis simultaneously with the shaping end completing one lap around the orbital path.

28. The method of claim 23 further including the step of forming a hole of irregular and axially varying trajectory in the workpiece by moving the shaping tool relative to a workpiece along the axial axis simultaneously with said step of adjusting the radial position of the axial axis at the first and second regions.

29. The method of claim 28 wherein said step of moving the shaping tool relative to the workpiece includes moving the workpiece while maintaining the spindle axially fixed.

30. The method of claim 23 wherein said step of establishing a magnetic levitation field about the first region of the spindle includes positioning at least three magnet stators spaced in generally equal arcuate increment; in a common plane about the axial axis.

31. The method of claim 30 wherein said step of establishing a magnetic levitation field about the second region of the spindle includes positioning at least three magnet stators in generally equal arcuate increments in a common plane about the axial axis.

32. The method of claim 31 wherein the step of adjusting the radial position of the axial axis at the first and second regions includes spacing at least three first position sensors in generally equal arcuate increments in a common plane about the axial axis proximate to the at least three magnet stators the first region, and spacing at least three first position sensors in generally equal arcuate increments in a common plane about the axial axis proximate to the at least three magnet stators the second region.

33. The method of claim 23 wherein said step of establishing a magnetic levitation field about the first region of the spindle includes positioning a pair of opposing X-coordinate magnet stators and a pair of opposing Y-coordinate magnet stators, and spacing the X-coordinate magnet stators between and generally co-planar with the Y-coordinate magnet stators.

34. The method of claim 33 wherein said step of establishing a magnetic levitation field about the second region of the spindle includes positioning a pair of opposing X-coordinate magnet stators and a pair of opposing Y-coordinate magnet stators, and spacing the X-coordinate magnet stators between and generally co-planar with the Y-coordinate magnet stators.

35. The method of claim 34 further including the step of varying the supply of current to each of the pair of X-coordinate magnets of said first bearing cluster in non-linearly proportional increments.

36. The method of claim 34 wherein the step of adjusting the radial position of the axial axis at the first and second regions includes fixing a position sensor adjacent to each of said magnet stators.

* * * * *

UNITED STATES PATENT AND TRADEMARK OFFICE
CERTIFICATE OF CORRECTION

PATENT NO. : 7,264,430 B2  Page 1 of 1
APPLICATION NO. : 11/065618
DATED : September 4, 2007
INVENTOR(S) : Kenneth R. Bischof and William J. Zdeblick It is certified that error appears in the above-identified patent and that said Letters Patent is hereby corrected as shown below:

Column 9, line 32: "ax al axis" should be --axial axis--.

Column 9, line 34: "outwardly front said" should be --outwardly from said--.

Column 11, lines 20-21: "work piece" should be --workpiece--.

Column 12, line 18: "increment" should be --increments--.

Signed and Sealed this

Twenty-ninth Day of April, 2008

JON W. DUDAS
*Director of the United States Patent and Trademark Office*